United States Patent
Cui et al.

(10) Patent No.: US 9,046,680 B2
(45) Date of Patent: Jun. 2, 2015

(54) SCANNING ILLUMINATION MICROSCOPE

(75) Inventors: Xiquan Cui, Pasadena, CA (US);
Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1238 days.

(21) Appl. No.: 12/399,823

(22) Filed: Mar. 6, 2009

(65) Prior Publication Data

US 2009/0225411 A1    Sep. 10, 2009

Related U.S. Application Data

(60) Provisional application No. 61/068,512, filed on Mar. 7, 2008.

(51) Int. Cl.
*G02B 21/06* (2006.01)
*G02B 21/00* (2006.01)

(52) U.S. Cl.
CPC ............ *G02B 21/0024* (2013.01); *G02B 21/06* (2013.01); *G02B 21/0032* (2013.01)

(58) Field of Classification Search
CPC ...... G02B 5/32; G02B 21/00; G02B 21/0004; G02B 21/0024; G02B 21/0032; G02B 21/0036; G02B 21/004; G02B 21/0048; G02B 21/06; G02B 21/36; G01N 21/6452; G01N 21/253; G01N 21/6428; G01N 21/6458; G01N 15/1475; G01N 15/1434; G01N 15/1484
USPC .................. 359/368–390, 198–225, 12, 20; 250/234, 459.1, 578.1

See application file for complete search history.

(56) References Cited

U.S. PATENT DOCUMENTS

| | | | | |
|---|---|---|---|---|
| 5,587,832 A * | 12/1996 | Krause | ........................... | 359/385 |
| 5,936,764 A * | 8/1999 | Kobayashi | .................... | 359/385 |
| 6,133,986 A * | 10/2000 | Johnson | ......................... | 355/67 |
| 6,248,988 B1 * | 6/2001 | Krantz | ........................ | 250/201.3 |
| 6,636,300 B2 * | 10/2003 | Doemens et al. | .......... | 356/141.1 |
| 7,209,287 B2 * | 4/2007 | Lauer | ............................. | 359/368 |
| 7,468,507 B2 * | 12/2008 | Rogers et al. | ................. | 250/234 |
| 2007/0245363 A1* | 10/2007 | Bakker et al. | ................. | 720/672 |
| 2007/0277192 A1* | 11/2007 | Hendriks et al. | ............. | 720/745 |
| 2008/0212430 A1* | 9/2008 | Bakker et al. | ................. | 369/53.11 |
| 2009/0218514 A1* | 9/2009 | Klunder et al. | ............ | 250/459.1 |
| 2009/0218527 A1* | 9/2009 | French et al. | .............. | 250/578.1 |

OTHER PUBLICATIONS

Goodman et al., "Introduction to Fourier Optics", 3rd edition, (2005), Roberts & Company Publishers, pp. 297-393.

* cited by examiner

*Primary Examiner* — Thong Nguyen
(74) *Attorney, Agent, or Firm* — Gates & Cooper LLP

(57) ABSTRACT

A microscopy method and configuration provides the ability to achieve wide field view and high resolution simultaneously. A beam array generator generates an M×N light beam array that illuminates a sample and an M×N sensor array. The sensor array obtains a whole microscopy image of the sample based on the light beam array. Each light beam of the array corresponds to one unique pixel sensor in the sensor array. A scanning of all light beams of the light beam array covers a whole area of the sample.

2 Claims, 6 Drawing Sheets

SCANNING ILLUMINATION MICROSCOPE

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/068,512, filed on Mar. 7, 2008, by Xiquan Cui and Changhuei Yang, entitled "Scanning Illumination Microscope".

STATEMENT REGARDING FEDERALLY SPONSORED RESEARCH AND DEVELOPMENT

This invention was made with government support under Grant No. W81XQH-09-1-0051 awarded by US Army Medical Research Command. The government has certain rights in the invention.

BACKGROUND OF THE INVENTION

1. Field of the Invention

The present invention relates generally to microscopy, and in particular, to a microscopy method and apparatus that can achieve wide field view and high-resolution at the same time.

2. Description of the Related Art

In modern biological practices, microscopy techniques may be needed that have a large field view and high-resolution at the same time. However, because of the limited field of view of a high resolution objective lens in a conventional microscope, prior art solutions were required to translate the sample stage to increase the scope. Such translation was often time-consuming. Accordingly, what is needed is a new microscopy method that can achieve wide field view and high-resolution at the same time.

SUMMARY OF THE INVENTION

One or more embodiments of the invention provide a microscope system that includes a beam array generator and corresponding sensor array. Each light beam corresponds to one unique sensor pixel and raster scanning of each light beam covers the whole area of the corresponding pixel. The one-to-one correspondence between the light beams and sensor array pixels enable the capture of a high resolution image simultaneously (and dynamically) with a wide field-of-view.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Microscope

Figure 1:
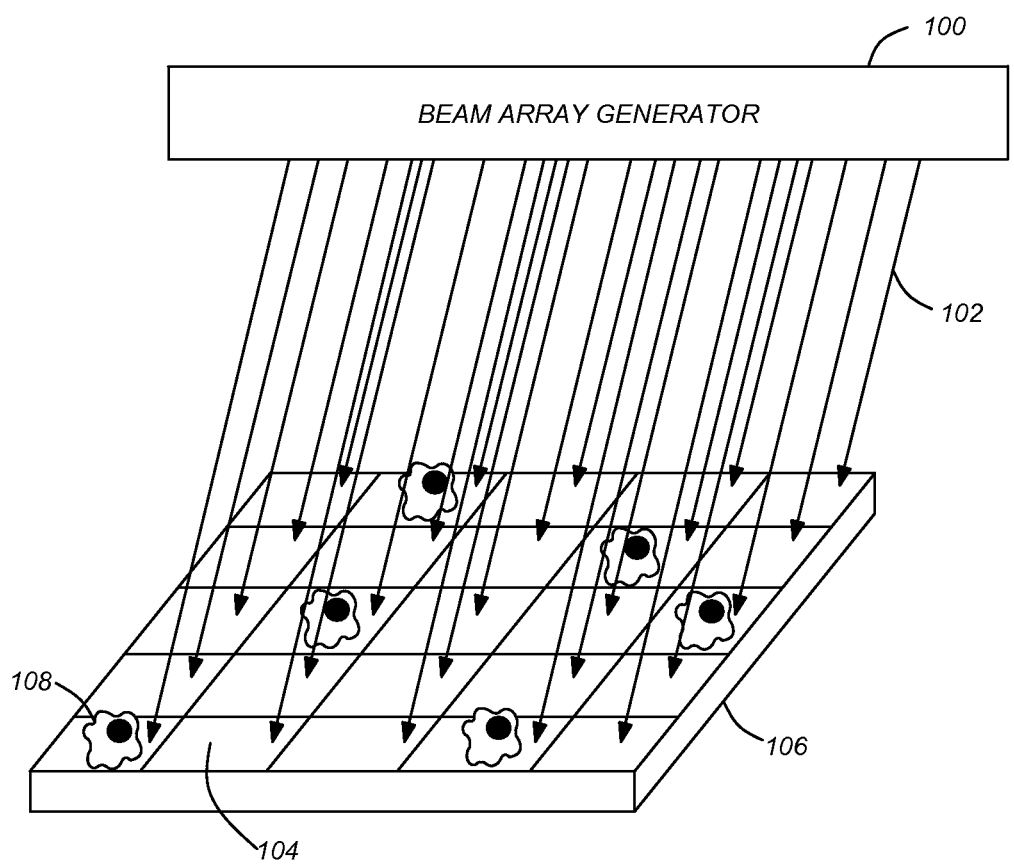
FIG. 1 illustrates a perspective view of a microscope system used in accordance with one or more embodiments of the invention.
Figure 2A:
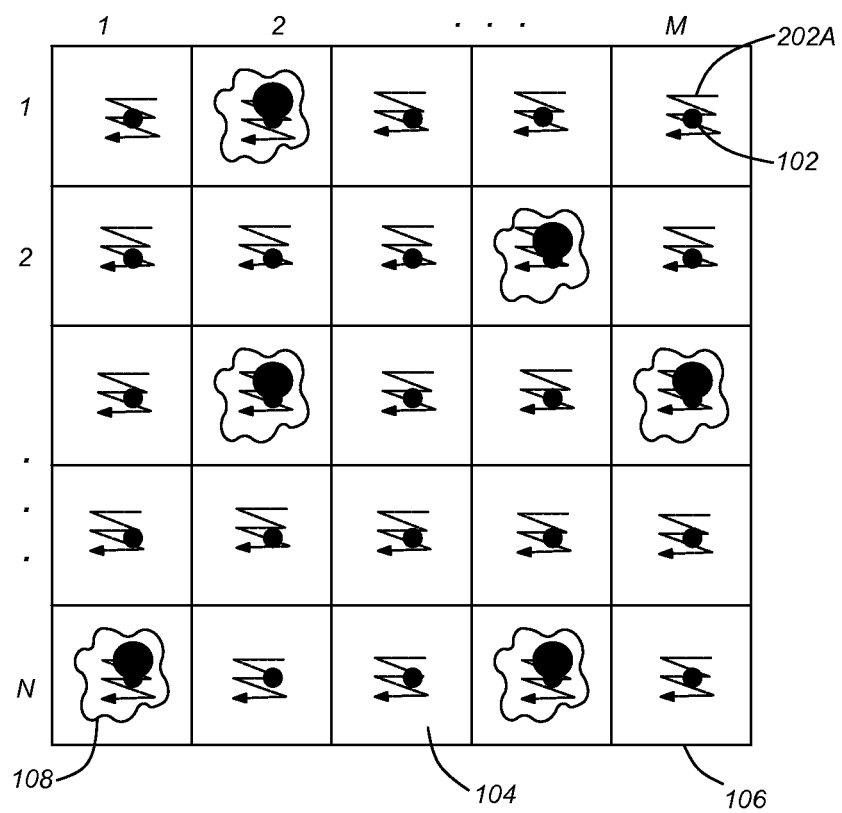
FIG. 2 illustrates a top view of a sensor array of FIG. 1 with samples in accordance with one or more embodiments of the invention.
Figure 2B:
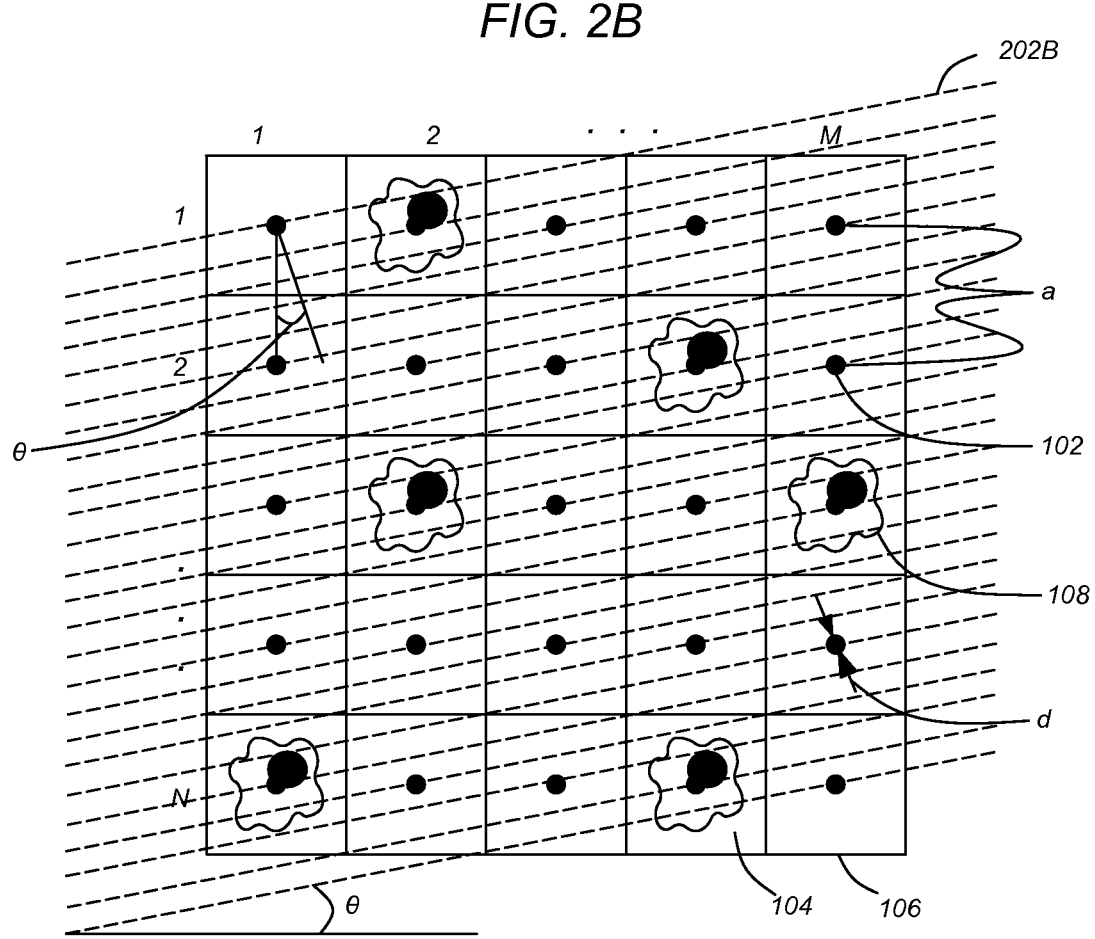

One or more embodiments of the invention provide a new microscope system that consists of an M×N photo sensor array and a corresponding M×N light beam array. FIG. 1 illustrates a perspective view of a microscope system used in accordance with one or more embodiments of the invention. FIG. 2A illustrates a top view of a sensor array of FIG. 1 with a sample and pixels that are raster scanned in accordance with one or more embodiments of the invention. FIG. 2B illustrates a top view of a sensor array of FIG. 1 with a sample and pixels that are diagonal translation scanned in accordance with one or more embodiments of the invention. The beam array generator 100 generates multiple light beams 102. Each light beam 102 corresponds to one unique photo sensor pixel 104 on the sensor array 106. The scanning of each light beam 102 covers the whole area of the corresponding pixel 104.

In FIG. 2A, raster scanning of the light beam/spot light 102 is used to obtain a whole microscopy image of the sample. This can be done in two ways. In a first embodiment, the light beam/spot light 102 is moved in a manner 202A to cover the whole area of the corresponding pixel 104. The coverage of an entire area of a pixel 104 (i.e., the movement of the light beam/spot light 102 within a pixel 104) is represented by arrow 202A. When a sample 108 is placed on top of the photo sensor array 106, the raster-scanning of all the light beams 102 in parallel provides a whole microscopy image of the sample 108 in a short time.

In a second embodiment, the light beams 102 and the pixels 104 (i.e., the beam array generator 100 and sensor array 106) are fixed with respect to each other (referred to hereafter as light-beam-pixel structure). When a sample 108 is placed on top of the photo sensor array 106 and raster-scanned over an area bigger than the size of a pixel 104, a whole microscopy image of the sample 108 can be achieved in a short time. Similarly, fixing the sample and raster-scanning the light-beam-pixel structure over an area bigger than the size of a pixel 104 can also provide a whole microscopy image of the sample 108. FIGS. 1, 2A, and 2B all illustrate the use of a sample 108 having multiple parts distributed over various pixels 104.

FIG. 2B illustrates a diagonal translation scan for each beam/light spot 102 in accordance with one or more embodiments of the invention. In such an embodiment, the light beams 102 and the pixels 104 (i.e., the beam array generator 100 and sensor array 106) are fixed with respect to each other. The samples 108 can be translated with respect to the light-beam-pixel structure in a diagonal fashion 202B. As illustrated, a complete 2D mapping of the sample surface can be achieved. Similarly, the light-beam-pixel structure can be translated (as a unit) with respect to the samples 108 in the diagonal fashion 202B (i.e., the sample 108 is fixed in its position, the beam array generator 100 and sensor array 106 are fixed with respect to each other, and the light-beam-pixel structure is translated with respect to the sample 108). Such a translation of the light-beam-pixel structure also provides a complete 2D mapping resulting in a whole microscopy image.

To provide complete coverage of each pixel 104, a certain range of diagonal angles may be used when conducting the diagonal translation 202B scan. As illustrated in FIG. 2B, the size of the light spots 102 is "d", the spacing between two neighboring light spots 102 is "a", the direction/angle of the scanning is θ, the number of light spots 102 in the vertical direction is N, and the number of light spots 102 in the lateral direction is M (i.e., M×N number of pixels). To fully scan the whole sample 108 area (e.g., for each pixel), the number of light spots 102 in the lateral direction M should be in compliance with the following equation:

$$M > \frac{a\cos\theta}{d}$$

Accordingly, M should be greater than the value described in the above equation.

The resolution of the imaging scheme is not determined by the pixel size of the photo sensor array 106, but the spot size of the light beams 102. It is because the light beam 102 only excites a very small volume of the sample 108, and the transmission detected by the corresponding pixel 104 only reflects the structural and composition properties of the sample 108 at this point. Accordingly, the sensor array 106 is used to determine the amount of light that is transmitted though the sample and thereby provide an appropriate image. Thus, a high resolution and wide field-of-view can be achieved simultaneously. The total imaging time is also short, because the whole scanning process is parallelized in M×N subdomains. In this regard, the scanning process is parallelized by simultaneously emitting the numerous light beams 102 from the beam array generator 100.

Virtual Sensor Array

Figure 3:
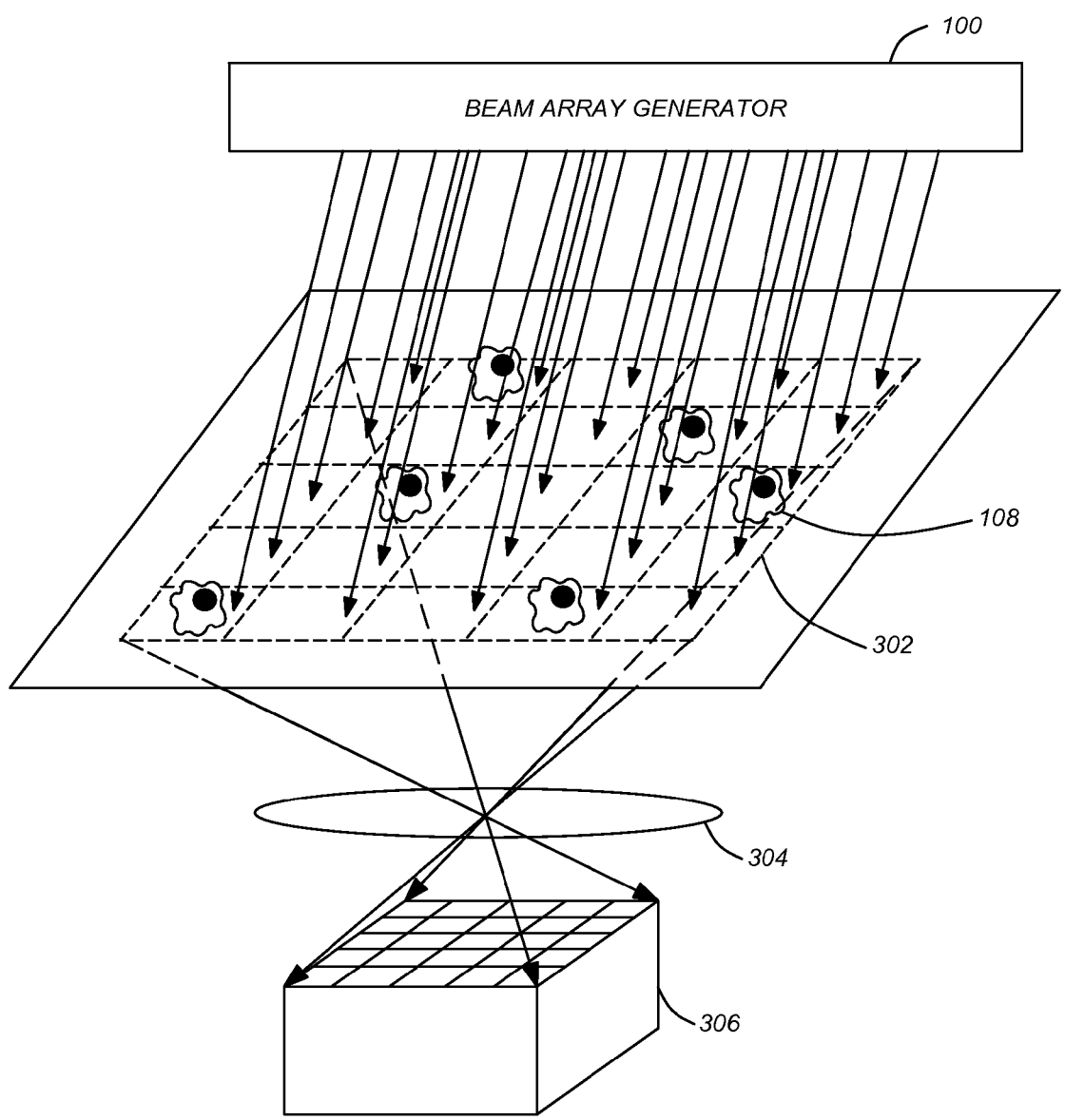
FIG. 3 illustrates an optical projection system used to create a virtual sensor array on a sample plane in accordance with one or more embodiments of the invention.

FIG. 3 illustrates an optical projection system used to create a virtual sensor array on a sample plane in accordance with one or more embodiments of the invention. As illustrated, the beam array generator 100 illuminates the sample 108 based on a virtual array 302 that is superimposed over the sample 108 (or placed coincident with the sample plane). The virtual array 302 consists of an M×N array based on an M×N beam array generator 100, thereby illuminating the sample 108 on a per pixel basis. A lens 304 is used to magnify and/or focus the image onto an image plane of the sensor array 306. Thus, the field of view of such a microscopy method can be changed by simply varying the magnification of the optical projection system by adjusting the lens 304.

Alternative Embodiments

The above described embodiments of the microscope system provide a transmission mode. By putting the beam array 100 and the sensor array 106/306 on the same side of the sample 108, embodiments of the invention may provide a reflection mode of the microscope system.

By inserting a fluorescent filter in front of the sensor array 106/306, embodiments can also provide a fluorescent microscope.

The photo sensor 106/306 can be any two-dimensional (2D) photo sensor array, e.g. CCD (charge-coupled device), CMOS (complementary metal oxide semiconductor), APD (avalanche photodiode) array, PMT (photomultiplier tube) array, etc.

The light beam array generator 100 can be a spatial light modulator, or any other holography methods.

The raster-scanning of the light beams 102 can be performed by either mechanically moving the beam array generator 100, or computationally changing the phase modulation on the spatial light modulator.

Control/Display Mechanism

Figure 4:
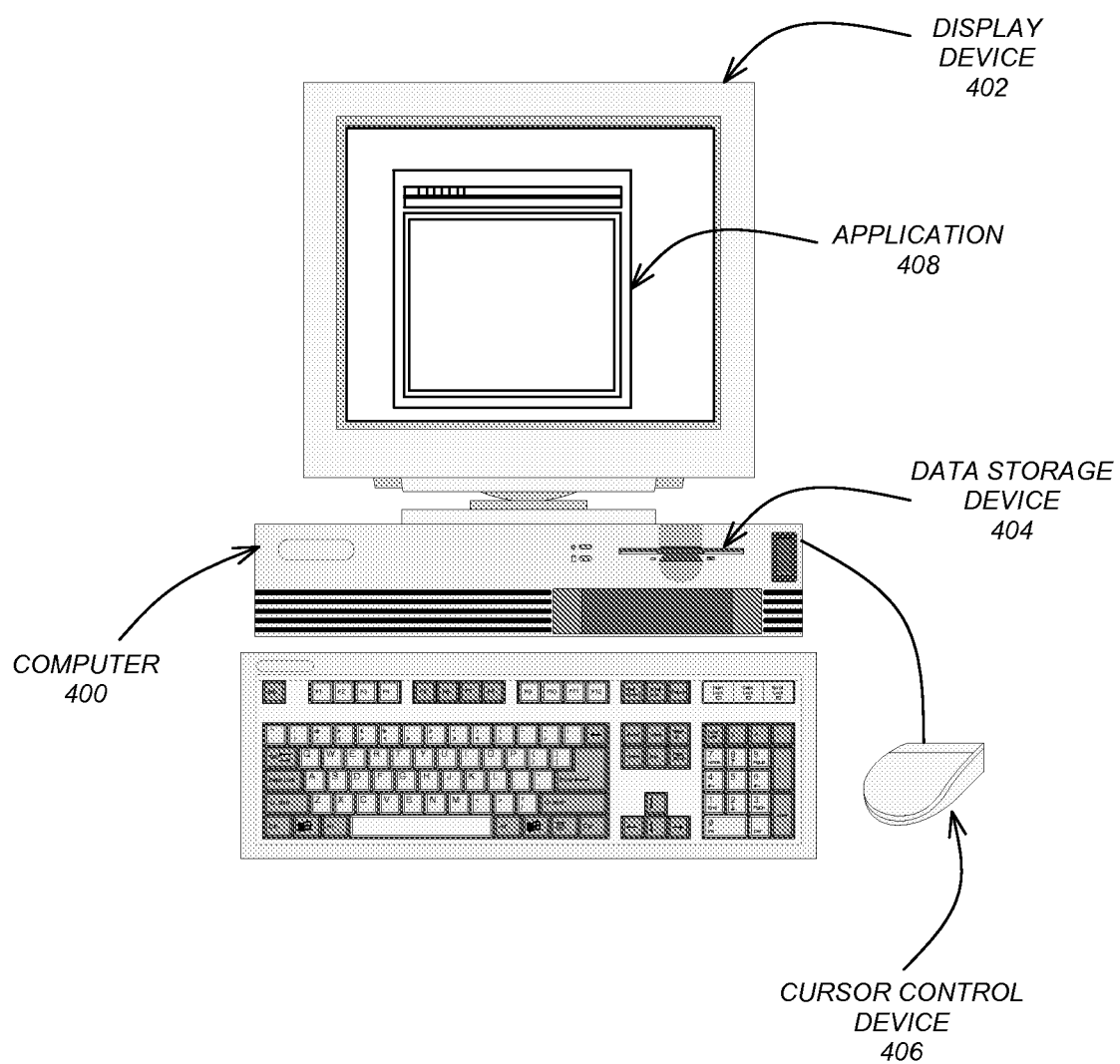
FIG. 4 illustrates an exemplary computer system that could be used to implement elements of the present invention.

To display/output information in the sensor array 106/306, the sensor array 106/306 may be communicatively coupled to a computer or display device to enable the microscopy image to be stored and/or displayed. FIG. 4 illustrates an exemplary computer system that could be used to implement elements of the present invention, including the user computer 400, display device 402, data storage device 404, cursor control device 406, and application 408 executing on computer 400. A computer system used in accordance with embodiments of the invention may also include servers and/or databases. The computer 400 may comprise a general purpose hardware processor and/or a special purpose hardware processor (hereinafter alternatively collectively referred to as processor) and a memory, such as random access memory (RAM) or data storage device 404.

The computer 400 may be coupled to other devices, including input/output (I/O) devices such as the sensor array 106/306, a keyboard, a mouse/cursor control device 406 and a printer. In one embodiment, the computer 400 operates by the general purpose processor performing instructions defined by the computer program/application 408 under control of an operating system. The computer program 408 and/or the operating system may be stored in the memory and may interface with a user and/or other devices to accept input and commands and, based on such input and commands, and the instructions defined by the computer program 408 and operating system, provide output and results.

The computer 400 may further be used to control the use of the microscope of the invention. In such an embodiment, the computer 400 may also be communicatively coupled to the beam array generator 100.

Output/results may be presented on the display 402 or provided to another device for presentation or further processing or action. In one embodiment, the display 402 comprises a liquid crystal display (LCD) having a plurality of separately addressable liquid crystals. Each liquid crystal of the display 402 changes to an opaque or translucent state to form a part of the image on the display in response to the data or information generated by the processor from the application of the instructions of the computer program 402 and/or operating system to the input and commands. The image may be provided through a graphical user interface (GUI) module. Although the GUI module may be a module separate from application 408, the instructions performing the GUI functions can be resident or distributed within the operating system, the computer program 408, or implemented with special purpose memory and processors. Further, the display device 402 in connection with the sensor array 106/306 may have the capability to display, store, and/or manipulate the microscopy image whether used in connection with computer 400 or otherwise. In this regard, the display device 402 may be communicatively coupled directly to sensor array 106/306 for display of data captured by sensor array 106/306.

Some or all of the operations performed by the computer 400 according to the computer program 408 instructions may be implemented in a special purpose processor. In this embodiment, some or all of the computer program 408 instructions may be implemented via firmware instructions stored in a read only memory (ROM), a programmable read only memory (PROM) or flash memory within the special purpose processor or in memory. The special purpose processor may also be hardwired through circuit design to perform some or all of the operations to implement the present invention. Further, the special purpose processor may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 400 may also implement a compiler that allows an application program 408 written in a programming language such as COBOL, C++, FORTRAN, or other language to be translated into processor readable code. After completion, the application or computer program 400 accesses and manipulates data accepted from I/O devices and stored in the memory of the computer using the relationships and logic that was generated using the compiler.

The computer 400 also optionally comprises an external communication device such as a modem, satellite link, Ethernet card, or other device for accepting input from, and providing output to, other computers.

In one embodiment, instructions implementing the operating system, the computer program 408, and the compiler are tangibly embodied in a computer-readable medium, e.g., data storage device 404, which could include one or more fixed or removable data storage devices, such as a zip drive, floppy disc drive, hard drive, CD-ROM drive, tape drive, etc. Further, the operating system and the computer program 408 are comprised of computer program instructions which, when accessed, read and executed by the computer 400, causes the computer 400 to perform the steps necessary to implement and/or use the present invention or to load the program of instructions into a memory, thus creating a special purpose data structure causing the computer to operate as a specially programmed computer executing the method steps described herein. Computer program 408 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 400.

Although the term "computer" is referred to herein, it is understood that a computer 400 may include portable devices such as cellphones, notebook computers, pocket computers, or any other device with suitable processing, communication, and input/output capability.

Logical Flow

Figure 5:
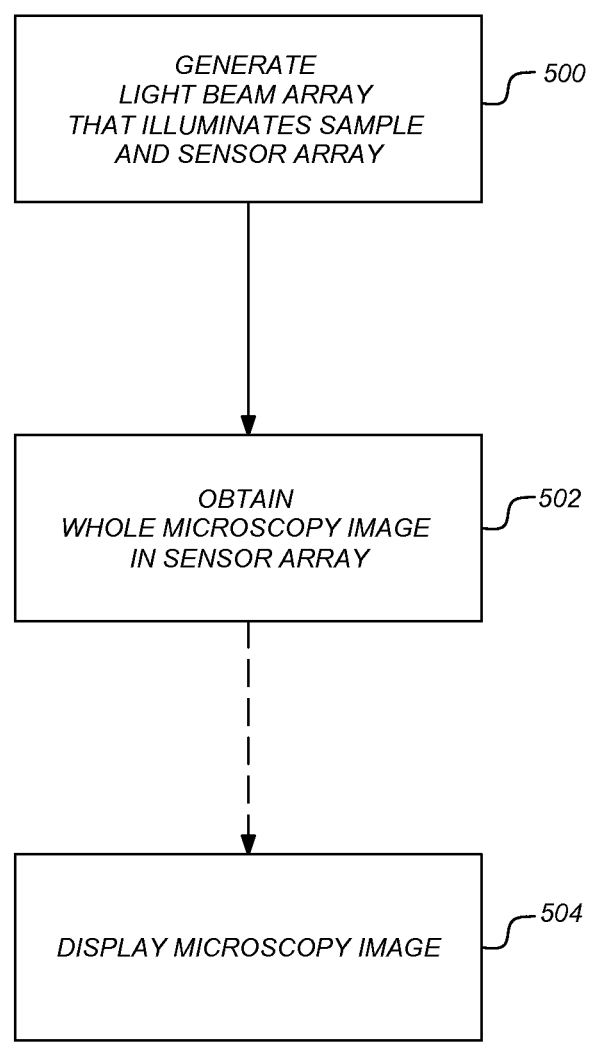
FIG. 5 illustrates the logical flow for obtaining a microscopy image of a sample in accordance with one or more embodiments of the invention.

FIG. 5 illustrates the logical flow for obtaining a microscopy image of a sample in accordance with one or more embodiments of the invention. At step 500, a beam array generator is used to generate an M×N light beam array that illuminates the sample and an M×N sensor array (where M may or may not be equal to N).

At step 502, sensor array is used to obtain the whole microscopy image of the sample based on the light beam array. Each light beam of the light beam array corresponds to one unique pixel sensor in the sensor array. Further, a scanning of all light beams of the light beam array covers a whole area of the sample with high resolution.

There are three configurations that can be used to conduct such scanning. In a first configuration, the sensor array and samples are fixed to each other while a raster scan by the light beam array is conducted to cover the whole area of the sample (e.g., to cover an entire corresponding pixel with each light beam). In a second configuration, the light beam array is fixed with respect to the sensor array and the sample is moved to provide a raster scan. In a third configuration, a diagonal translation scan is conducted. When diagonal translation scanning, the combination of all of the light beam scans together with the corresponding pixel array provide for imaging the whole area of the sample (e.g., by combining the results of the scan over time to come up with a complete/whole image of the sample).

Thus, the microscopy image may be obtained by placing the sample on top of the sensor array and raster or diagonal translation scanning each light beam in parallel (i.e., simultaneously) across M×N subdomains. Alternatively, as described above, a virtual sensor may be located on a sample plane and an imaging lens is used to focus the light beams transmitted through the sample plane onto the sensor array. All of the different scanning techniques may also be used with a virtual sensor embodiment. The imaging lens may further be used to determine a magnification level of the image.

In another embodiment the beam array generator and sensor may be located on a same side of the sample to provide a reflective based microscope. Alternatively (or in addition), a fluorescent filter may be used in conjunction with the sensor array (e.g., placed in front of or between the sample and sensor array) to provide a fluorescent microscope.

It may be noted that the scanning to obtain the microscopy image of the sample is a function of time. Accordingly, multiple frames of the sample may be captured based on the movement of the beam (or sample if the beam and array are fixed). Such multiple frames may produce a video or clip of frames. Further, operations on the clip may be performed to combine multiple frames and or to obtain a single image of a sample or portion of the sample.

At optional step 504, the whole microscopy image (and/or video) may be displayed on a display device that is communicatively coupled to the sensor array.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A microscope comprising:
   (a) a beam array generator configured to generate an M×N light beam array that illuminates a biological sample and an M×N sensor array; and
   (b) the M×N sensor array configured to obtain a whole microscopy image of the biological sample based on the M×N light beam array, wherein:
      (i) each light beam of the light beam array corresponds to one unique pixel sensor in the sensor array;
      (ii) a scanning of all light beams of the light beam array covers a whole area of the biological sample;
      (iii) the scanning comprises raster scanning; and
      (iv) a scanning of each light beam of the light beam array covers a whole area of a corresponding pixel.

2. A method for obtaining a microscopy image of a biological sample comprising:

(a) generating, using a beam array generator, an M×N light beam array that illuminates the biological sample and an M×N sensor array; and (b) obtaining, in the M×N sensor array, a whole microscopy image of the biological sample based on the M×N light beam array, wherein:

(i) each light beam of the light beam array corresponds to one unique pixel sensor in the sensor array;
  (ii) a scanning of all light beams of the light beam array covers a whole area of the biological sample;
  (iii) the scanning comprises raster scanning; and
  (iv) a scanning of each light beam of the light beam array covers a whole area of a corresponding pixel.

* * * * *